United States Patent [19]
Johnston, Jr.

[11] Patent Number: 5,067,685
[45] Date of Patent: * Nov. 26, 1991

[54] MODULAR ELECTRICAL BOX MOUNTING SYSTEM

[75] Inventor: Robert G. Johnston, Jr., Pompano Beach, Fla.

[73] Assignee: Fibrelon, Inc., Pompano Beach, Fla.

[ * ] Notice: The portion of the term of this patent subsequent to Feb. 5, 2008 has been disclaimed.

[21] Appl. No.: 564,284

[22] Filed: Aug. 6, 1990

Related U.S. Application Data

[63] Continuation-in-part of Ser. No. 402,568, Sep. 5, 1985.

[51] Int. Cl.⁵ .............................................. F16M 13/00
[52] U.S. Cl. ........................................ 248/676; 52/39; 248/237; 248/311.2; 248/906
[58] Field of Search ...................... 248/300, 27.1, 906, 248/311.2, 676, 678, 672, 237, 228, 188.9; 220/3.9, 3.92; 211/26; 52/39; 403/363, 374, 381, 409.1

[56] References Cited

U.S. PATENT DOCUMENTS

| | | | |
|---|---|---|---|
| 1,105,284 | 7/1914 | McMurtrie | 248/906 X |
| 1,332,690 | 3/1920 | Rosenfeld | 248/906 X |
| 1,531,423 | 3/1925 | Simpson | 248/906 X |
| 1,675,921 | 7/1928 | Buchanan | 248/906 X |
| 1,917,450 | 7/1933 | Lademann | 248/906 X |
| 1,983,670 | 12/1934 | Knight | 248/906 X |
| 3,521,332 | 7/1970 | Kramer | 248/911 X |

FOREIGN PATENT DOCUMENTS 1425899 2/1976 United Kingdom ................ 248/906

*Primary Examiner*—David L. Talbott
*Attorney, Agent, or Firm*—M. K. Silverman

[57] ABSTRACT

The invention constitutes to a modular electrical connector box mounting system particularly adapted for securable, re-positionable, suspension upon a roof-like structure, for use in conjunction with other suspended equipment, such as air conditioning equipment, which is suspended upon a I-beam and a related truss structure.

4 Claims, 6 Drawing Sheets

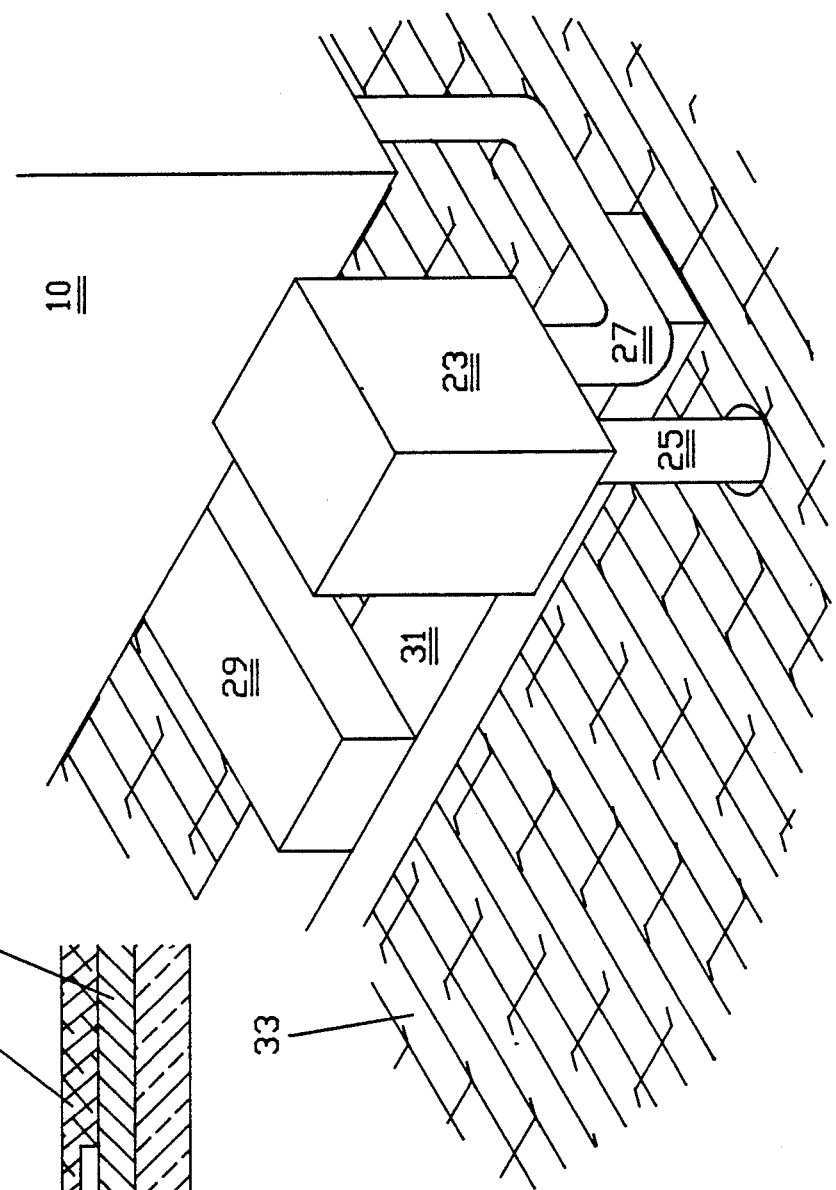
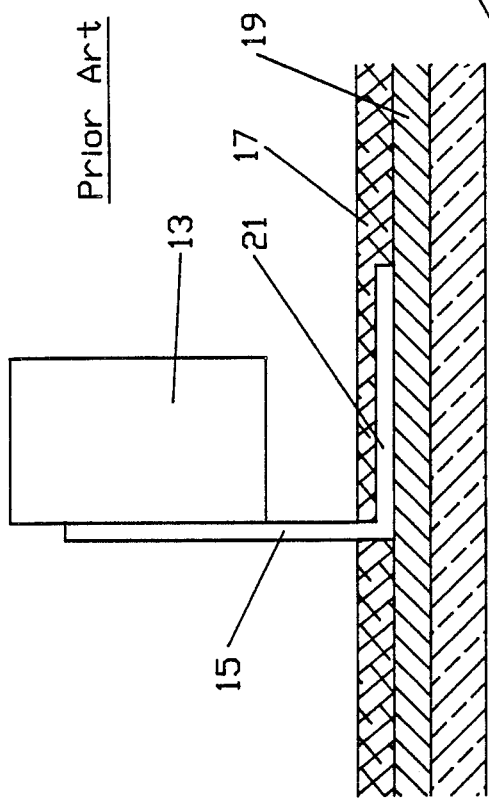

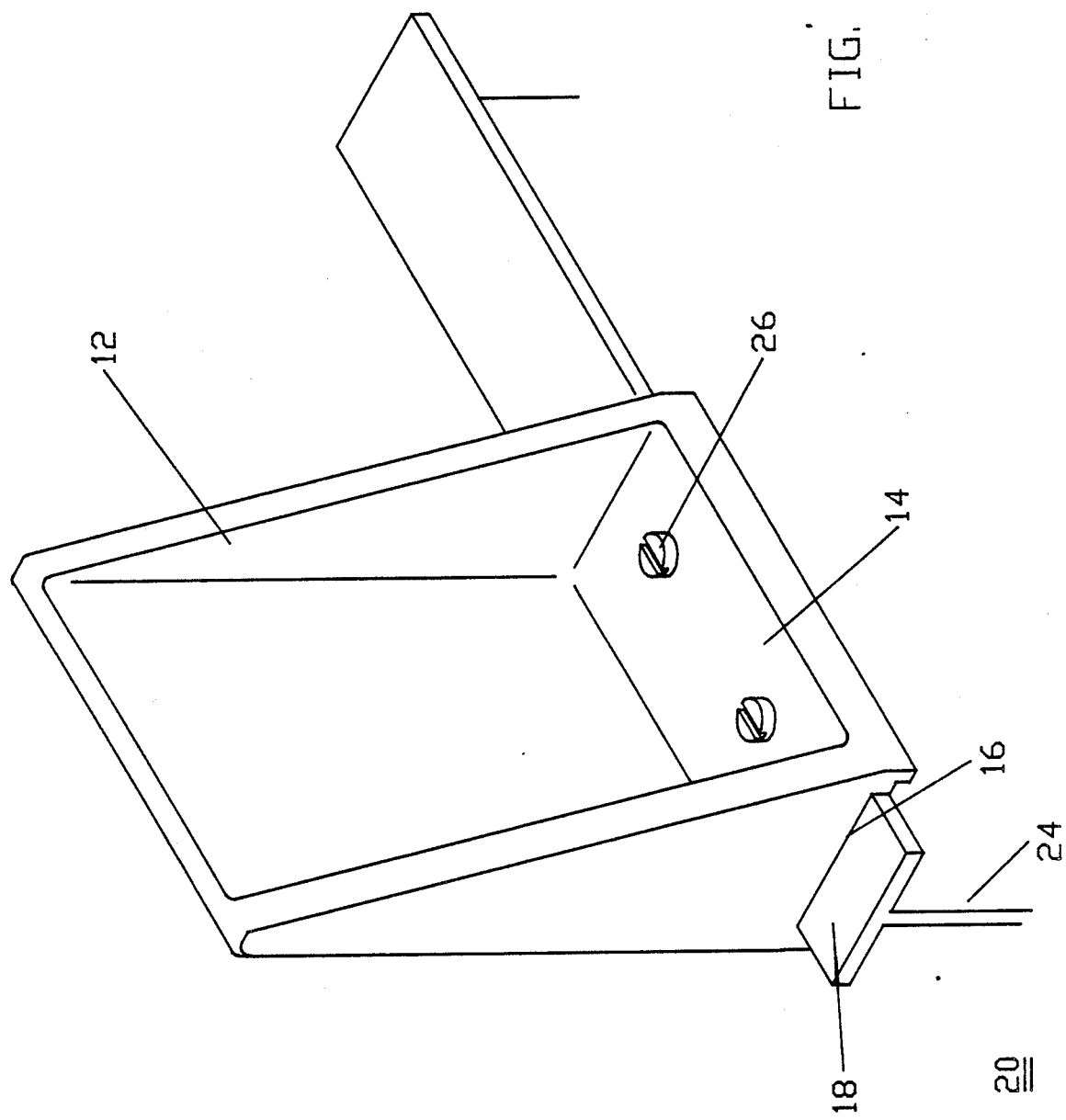

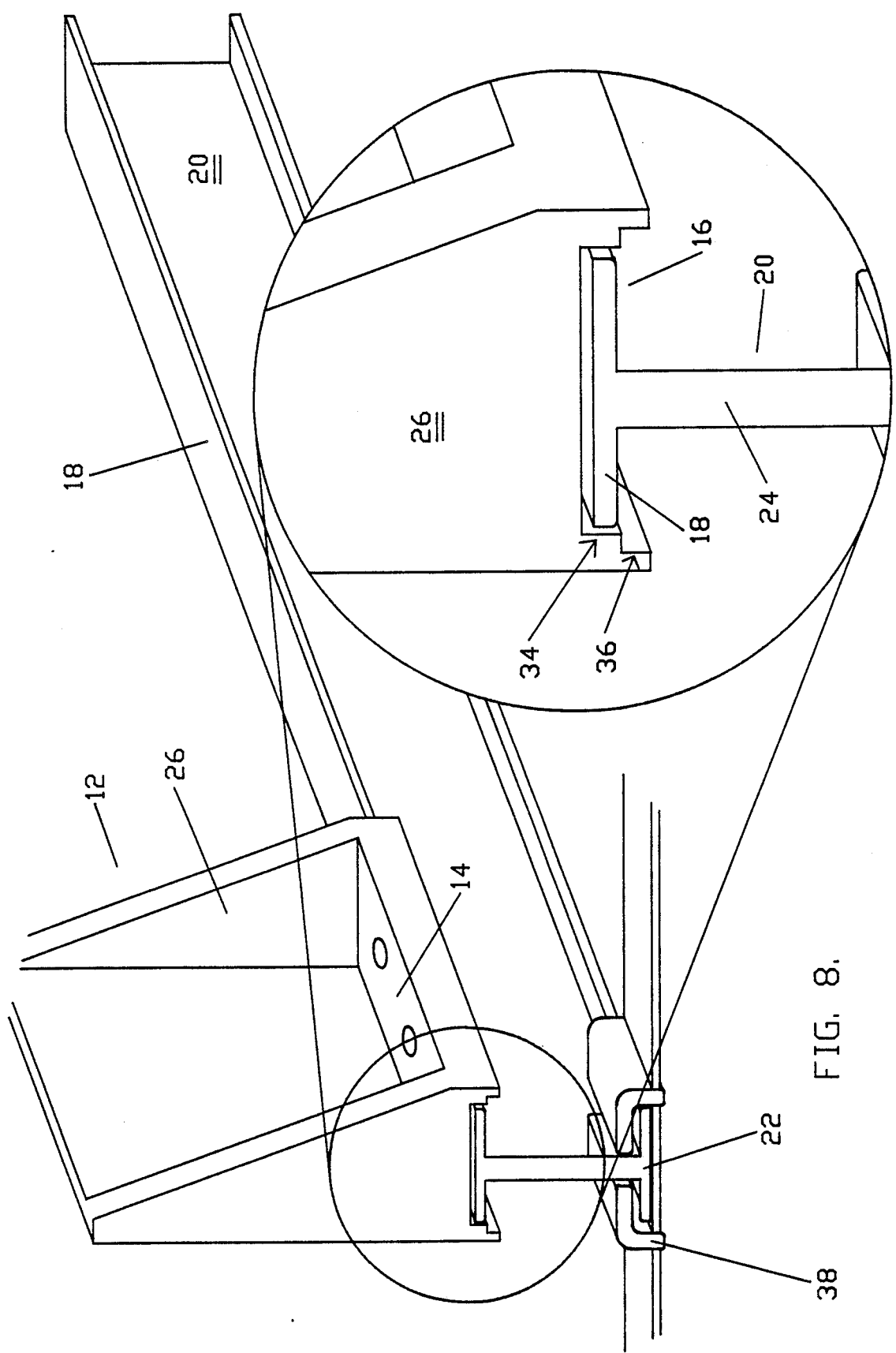

MODULAR ELECTRICAL BOX MOUNTING SYSTEM

REFERENCE TO RELATED APPLICATION

This case is a continuation in part of application Ser. No. 07/402,568, filed Sept. 5, 1985, entitled Equipment Roof Mounting System.

BACKGROUND OF THE INVENTION

The present invention relates to a modular electrical box mounting system particularly adapted for securable, re-positionable suspension of an electrical connector box upon a roof at a uniform height above the level of such a roof, preferably a flat horizontal roof. The instant invention is particularly adapted for securable suspension in association with a piece of air conditioning equipment or other equipment otherwise suspended such a flat horizontal roof, upon a pair of rail-like elements.

In the prior art, it has been customary to place electrical connector box directly on top of a horizontal roof. Such roofs are typically covered by a layer of tar or asphalt. Over time, the effect of heat and other elements of nature will cause the weight of the mounted electrical apparatus and associated hardware to penetrate into the various layers of roofing material including the asphalt and, further, the elements of nature will operate to cause the gradual rusting and degradation of the structural interface between the air conditioning equipment, electrical equipment or the like, on the one hand, and the roofing material of the horizontal roof, on the other hand. Resultingly, horizontal roof situated electrical connector boxes and other related equipment will gradually rust at their bases while penetrating the layer of roofing material until the roof proper is reached. When this has occurred, damage to the roof, electrical equipment and other associated equipment will accelerate and, in particular, such damage will place electrical wiring and related connections in the area of the base of the air conditioning, or other such equipment, at risk of electrical fire.

As a response to the above problem, various regulatory agencies, both state and federal, have proposed changes in building codes that would prohibit the direct placement of electrical and other equipment upon a horizontal roof. Under such building code regulations regarding electrical and related equipment placed upon a building, will require the support or suspension of such equipment upon a stand or bracket structure. It is, accordingly, as a response to such changes in the regulatory climate of the building industry that the present invention is directed.

Said proposed new building codes also require equipment support means that are non-conductive and non-corrosive, particularly where electrical equipment is involved. The instant invention accordingly responds in these areas to the need for safer and more effective air conditioning equipment support means than have been known in the art.

The inventor does not know of any pertinent art relative to support means for electrical connector boxes that would be relevant to the invention set forth below.

SUMMARY OF THE INVENTION

The present invention provides for the use of at least two I-beams, each I-beam having a top, a base parallel to said top and a rib normally integrally connecting said top and base of said I-beam the bottom of each I-beam proportioned for complemental, securable slidable engagement within a female track element which may be positioned either upon the roof structure or at the top of a truss or other support structure interposed between said slidable track and said roof. A base of the inventive modular electrical connectors box mounting means is itself provided with a female track which is proportioned for complemental, securable, slidable engagement with said top of said I-beam. Above said female channel is provided a right solid isosceles triangular structure to which an otherwise conventional electrical box may be secured as, for example, to the use of screw or nut and bolt means.

It is therefore an object of the present invention to provide a modular electrical box system capable of selectable slidable securement upon an I-beam structure for use with other electrical equipment that has also been secured upon said I-beam structure.

It is another object of the present invention to provide an improved system with the support of electrical equipment and outlet boxes upon a horizontal roof.

It is a further object to provide an equipment support system of the above type in which the materials thereof are non-conductive and non-corrosive.

It is a yet further object of the invention to provide a modular electrical support stand particularly adapted for use with air conditioning and other equipment supported upon a truss and I-beam structure, such an overall system having enhanced structure reliability and ease of assembly relative to functionally related systems known in the prior art.

It is another object of the invention to provide a system for the support of modular electrical connector boxes of the above type which is low in vibration as compared to functionally related systems o& the prior art.

It is a still further object to provide a system of the above type in which pieces of electrical equipment of varying lengths and widths can be readily accommodated and assembled from an inventive system formed of standardized modular constructional units of the type disclosed herein.

The above and yet other objects and advantages of the present invention will become apparent from the hereinafter set forth Brief Description of the Drawings, Detailed Description of the Invention, and Claims appended herewith.

BRIEF DESCRIPTION OF THE DRAWINGS

FIG. 1 is a cross-sectional side view of a prior art modular electrical box.

FIG. 2 is a perspective view of a prior art electrical mounting box.

FIG. 4 is a perspective view of the modular electrical connector box support system.

FIG. 8 is an enlarged operational view of the inventive system.

DETAILED DESCRIPTION OF THE INVENTION

Figure 3:
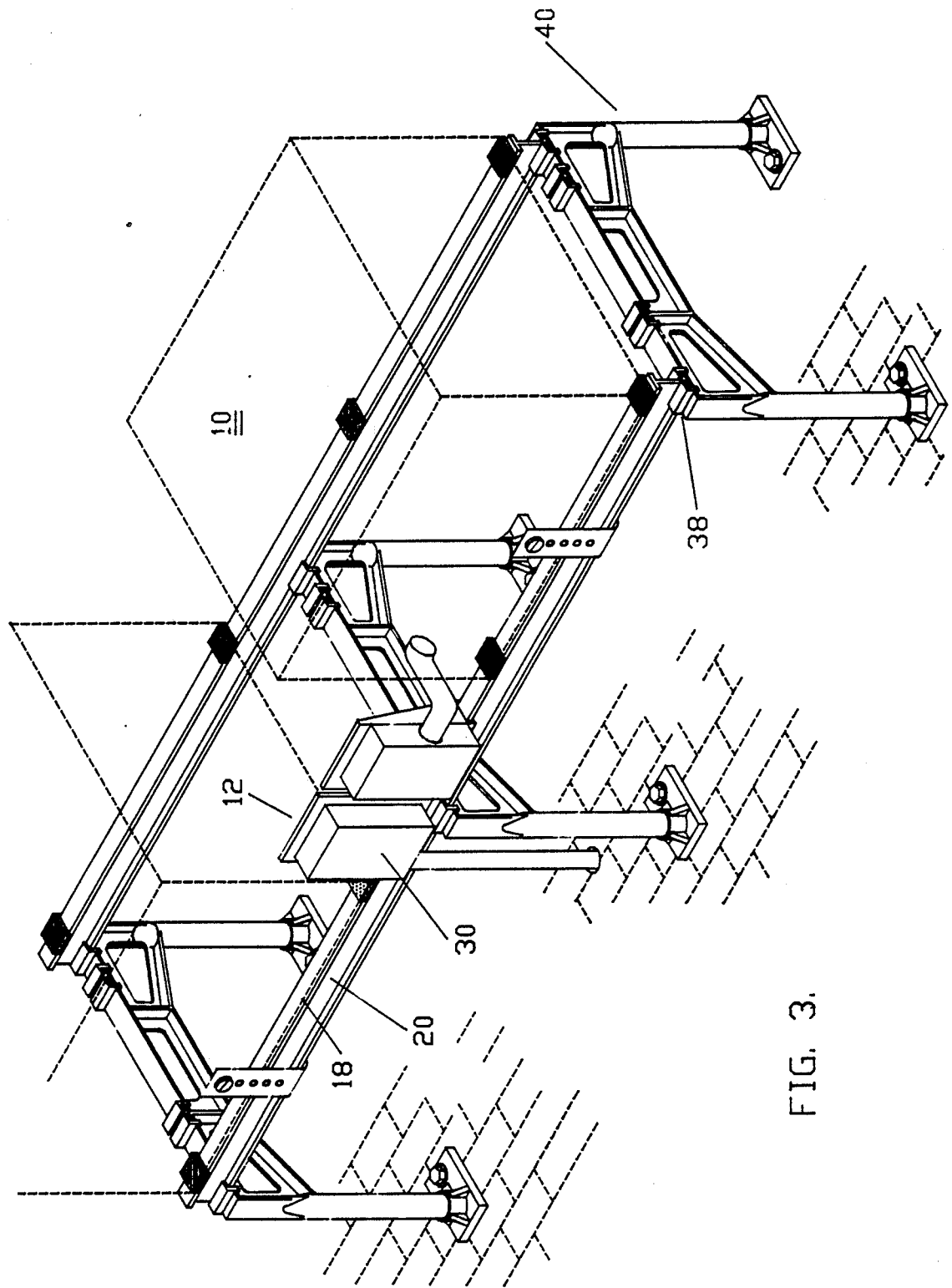
FIG. 3 is a perspective view of the instant invention used in association with an air conditioning roof mounting system.

With reference to the cross-sectional view of FIG. 1, a prior art electrical connector box 13 is seen to include a rigid vertical support 15 which is embedded below a surface 17 of a roof 19. Surface 17 will, comprise tar or asphalt and, as above noted in the Background of the Invention, such material is subject to wear such that, over time, horizontal surface 21 will become susceptible to exposure. Thereby, the potential for an electrical accident is enhanced. Further, the lifetime of surface 17 of roof 19 is, understandably, decreased by the presence of said elements 15 and 21 and various forces related to wind, rain and the like to which a prior art electrical box 13 is normally exposed.

In the perspective view of FIG. 2 is shown another type of prior art electrical box 23. In this prior art device, electrical wires run through vertical pipe 26, comprising the connector box 23 and, therefrom, through box 23 and into pipe 27 which comprises the output of electrical box 23. Therefrom power is provided to an elevated piece of equipment 10, in the nature of air conditioning apparatus. In the view of FIG. 2 simple use of beams 29 and 31 is employed to support the equipment 10 as well as the box 23. As may be appreciated, the prior art structure of FIG. 2 represents only a modest improvement over the situation shown in FIG. 1 in that through the use of pipe 25 and beam 31 damage will inevitably occur upon roof 33 thereby ultimately jeopardizing the integrity of the wiring passing through box 23 and pipes 25 and 27.

Figure 6:
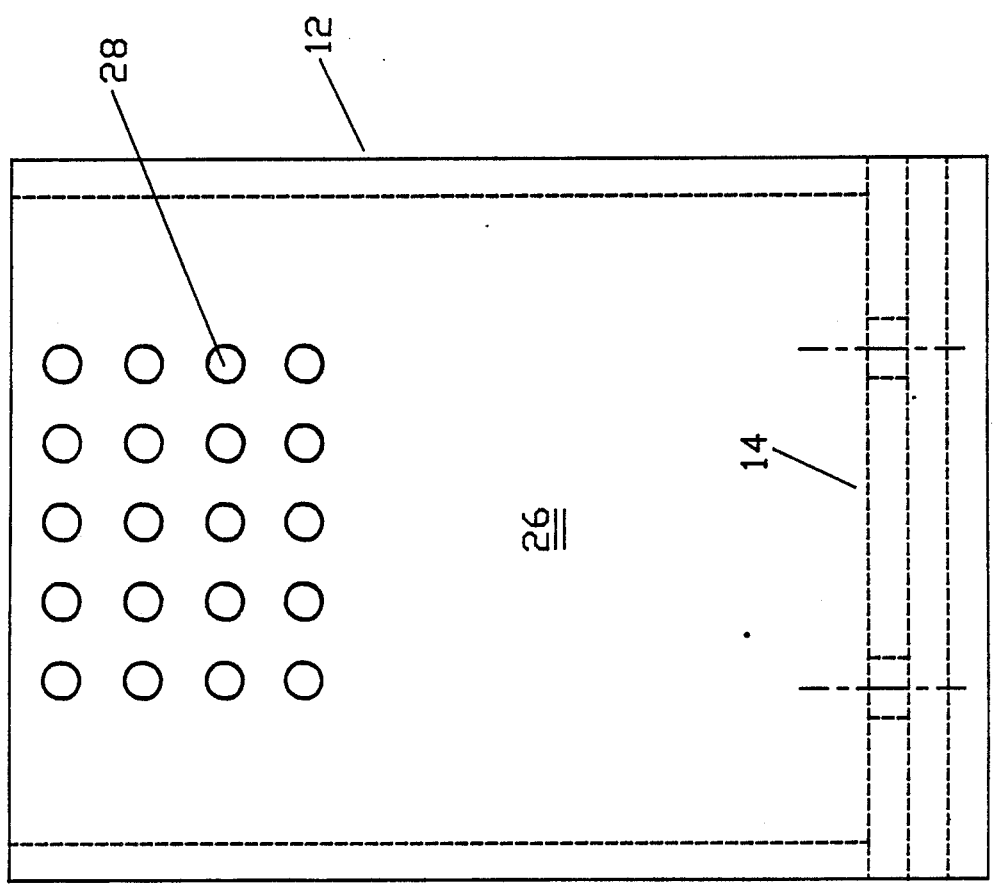
FIG. 6 is a front plane view of the electrical box support shown in FIG. 4.
Figure 7:
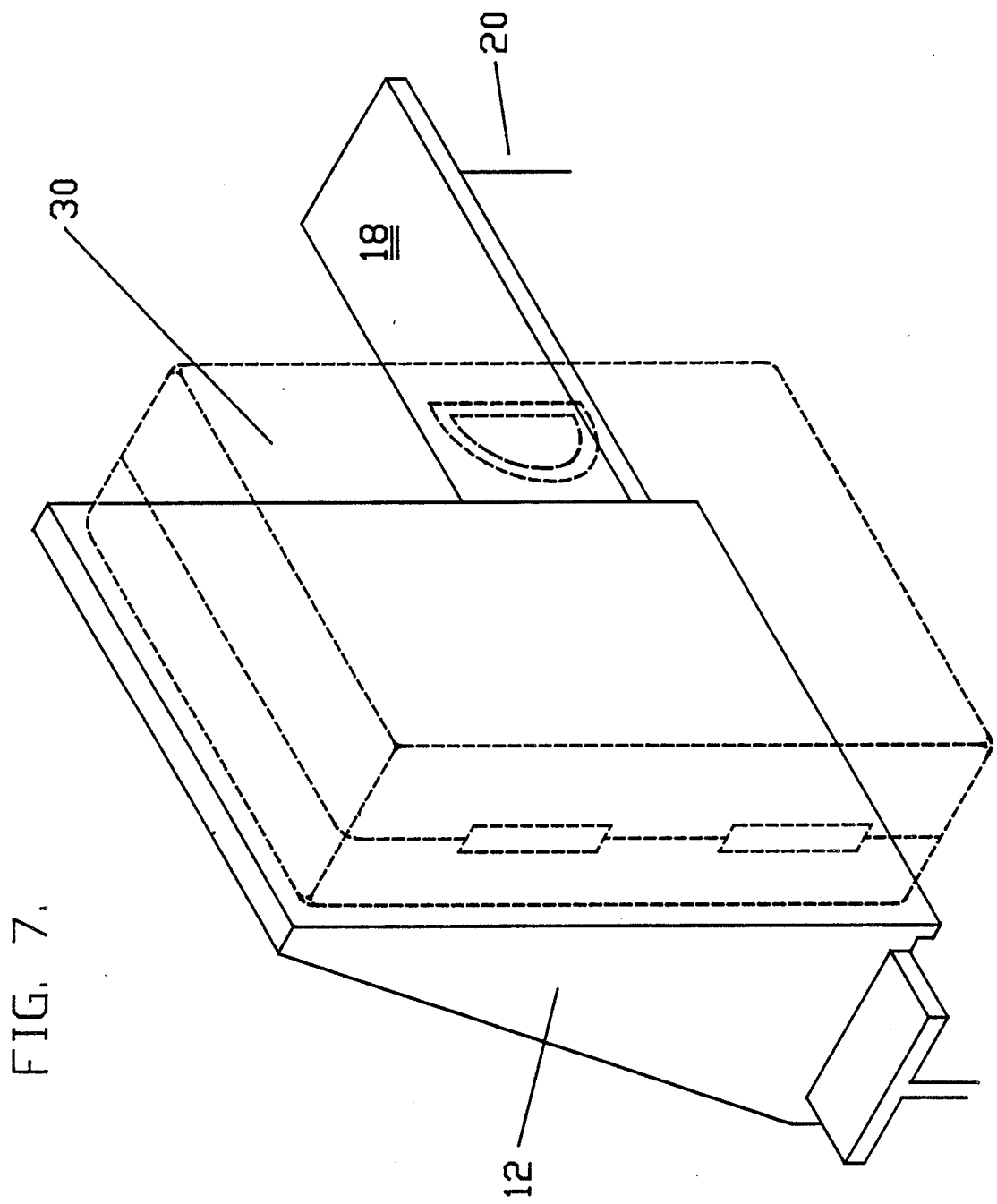
FIG. 7 is a perspective view, similar to the view of FIG. 4, however showing the electrical box, in phantom, relative to the electrical box mounting support.

With reference to the perspective view of FIG. 3, use of the present inventive modular electrical connector box mount 12 is seen. As may be noted in said view, as well as the view of FIG. 4, a base 14 of electrical box mount 12 is provided with a female recess 16 which is complemental securable, and slidable relative to a top 18 of an I-beam 20, said I-beam including said top 18, a base 22 parallel to said top, and a connecting rib 24. Said modular electrical box support 12 may be secured to top portion 18 of beam 20 through the use of screws 26 or other suitable selectable securement means. As may be noted from the views of FIGS. 5 and 6, said electrical modular box support 12, in addition to said base portion 14, is provided with an upright portion 26 that is provided with a plurality of holes 28 that may be employed to secure support 12 to a modular electrical box 30 in the fashion shown in FIGS. 3 and 7.

Accordingly, it may be appreciated that holes 28 are employed to effect securement between support wall 26 of support 12 and the electrical box 30, while hole 32 is employed to effect securement between (i) base 14 of support 12 and said top portion 18 of beam 20 and (ii) said complemental female recess 16 of support 12.

Figure 5:
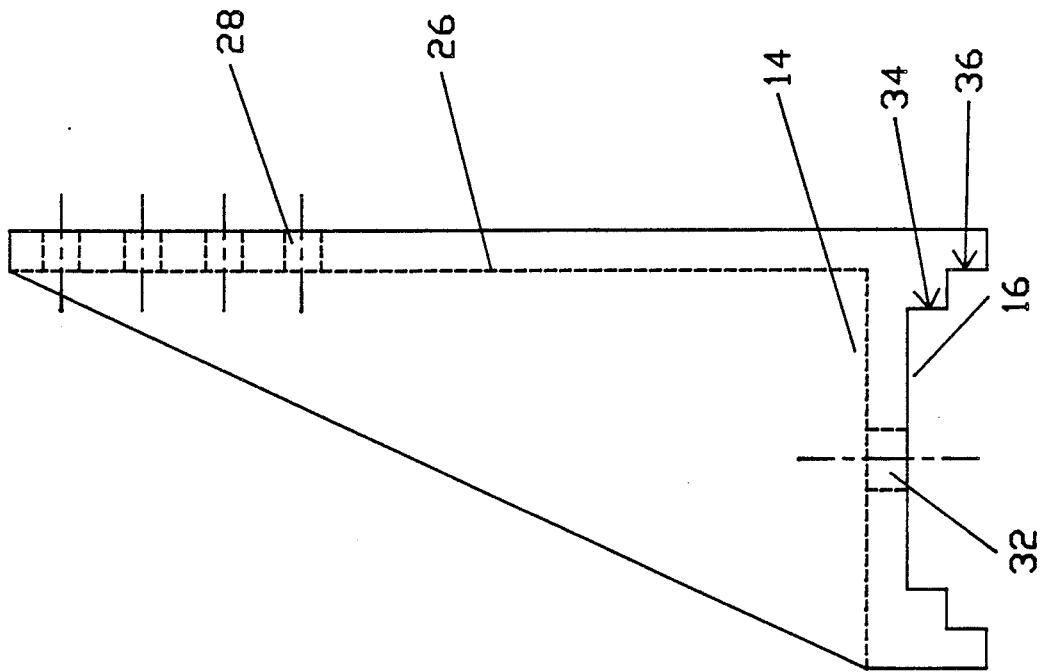
FIG. 5 is a side cross-sectional view of the electrical box support shown in FIG. 4.

As may be noted in the views of FIGS. 4 and 5 said female recess 16 is provided with two different horizontal dimensions, namely, dimensions 34 and 36, the largest of which (36) permits engagement between base 14 and the upper portion 18 of an I-beam having a larger transverse cross-section. See FIGS. 3, 4, 7 and 8.

It is therein to be noted that a female engagement means 38 (See FIGS. 3 and 8) engages base 22 of beam 20. Said means 38 is set upon a truss-like structure 40.

It is to be appreciated that through the use of a modular electrical box system of the type shown and described above any I-beam 20 may be secured, either using a truss structure 40 and its associated female engagement means 38 (see FIG. 3) or, alternatively, said I-beam 20 may be employed in connection with structures other than said truss structure 40.

In the views of FIGS. 3 and 8, the inventive electrical modular box support 12 is shown in conjunction with a system for the support of equipment upon a horizontal roof, the functionality of which is more completely described in my co-pending application Ser. No. 07/402,568, entitled Equipment Roof Mounting System.

The use of the modular electrical box support 12 above described, in the electrical box 30 may be readily re-positioned relative to the air conditioning units 10 by simply disengaging said screws 26 that are within recess 32 of base 12 of base 14 of box support 12. Accordingly, air conditioning unit 10 may be changed or removed in association with the instant system without the need for costly, time-consuming and difficult to disconnect and re-position electrical connection box as would be the case in prior art of the type shown and described with reference to FIGS. 1 and 2.

It is to be appreciated that the cross-sectional geometry of the instant modular electrical box mount 12 (see FIG. 5) may constitute any geometry which is capable of complemental engagement with a prior art electrical mounting electrical box 30 which, typically, will be made of metal, notwithstanding the fact that electrical box mount 12 in accordance with the present invention will, typically, be made of a fiberglass or heat resistant polymeric material.

Accordingly, while where has been shown and described the preferred embodiment of the present invention, it is to be appreciated that the invention may be embodied otherwise than is herein specifically shown and described and that within such embodiment, certain changes may be made in the detail and construction of the parts without departing from the underlying idea or principles of this invention with the scope of the Claim appended herewith.

Having thus described my invention what I claim as new, useful and non-obvious and, accordingly, secure by Letters Patent of the Unite States is:

1. A support system for an electrical box, comprising:
   (a) at least one I-beam, each beam having a top, a base parallel to said top, and a rib normally integrally connecting said top and said base of said I-beam, the bottom of said I-beam proportioned for complemental, securable slideable re-positionable engagement with a first female track means positioned upon a structure;
   (b) a modular electrical box mounting means having a female track proportioned for complemental, securable, slideable engagement with said top of said I-beam, said electrical box mounting means further having, in an upright surface thereof, openings proportioned for securement with an electrical connector box; and
   (c) at least two parallel space-apart trusses, each of said trusses having a pair of legs, which legs define lateral edges of each truss, each of said trusses having a linear top edge extending between those lines comprising longitudinal axes of said legs, said top edge having a transverse width, each of said edges having a plurality of second female track means, each of said track means having axes normal to said linear edge of each of said trusses, said second female track means proportioned for complemental slideable engagement with said base of said I-beam.

2. The system as recited in claim 1, in which said electrical box mounting means comprises a segment of a right side isosceles triangle proportioned for complemental engagement with an electrical box.

3. The system as recited in claim 1 in which said electrical box mounting means includes, at the base thereof, a plurality of said first female track means, any one of which may be selectively used for purposes of mating with a dimension of said top of said I-beam.

4. The system as recited in claim 3 in which said electrical box mounting means comprises a segment of a right side isosceles triangle proportioned for complemental engagement to an electrical box.

* * * * *